Jan. 5, 1954  F. D. GRAETZ  2,665,099
CAMERA TRIPOD
Filed Aug. 13, 1951
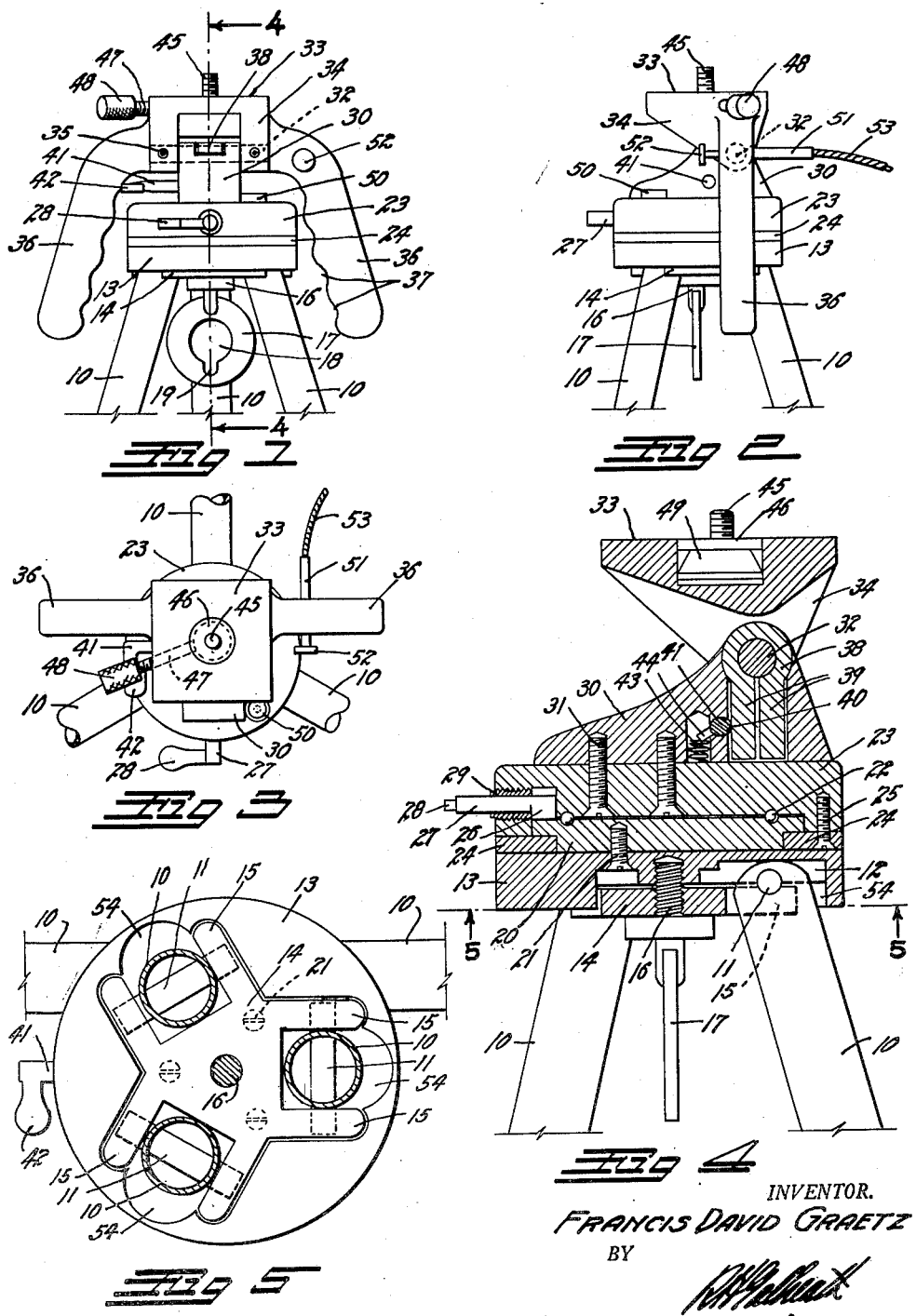
INVENTOR.
FRANCIS DAVID GRAETZ
BY
ATTORNEY Patented Jan. 5, 1954

2,665,099

UNITED STATES PATENT OFFICE 2,665,099

CAMERA TRIPOD

Francis David Graetz, Denver, Colo.

Application August 13, 1951, Serial No. 241,543

4 Claims. (Cl. 248—183)

This invention relates to a camera tripod, more particularly to a tripod for motion picture cameras, and has for its principal object the provision of an exceedingly rigid, highly efficient tripod and tripod head construction which will enable the photographer to easily, accurately, and smoothly direct the camera in any desired direction and to follow objects moving in any desired plane while his eye is trained upon the object through the camera finder.

Another object of the invention is to provide a smooth-acting, "panning" and tilting tripod with which the camera can be instantly and securely locked in any desired position without vibration and without removing the hands from the controls, and with which the camera shutter may be operated with the hands still in the controlling position.

A further object is to provide a horizontal bearing construction for a tripod head which will enable the camera to be rotated in a horizontal plane without vibration and without jerking, sticking, or other interferences with smooth operation which are so objectionable with telephoto lens work.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a rear view of the head portion of the improved tripod;

Fig. 2 is a right side view thereof;

Fig. 3 is a top view;

Fig. 4 is an enlarged, vertical section, taken on the line 4—4, Fig. 1; and

Fig. 5 is a bottom view of the head portion, taken on the line 5—5, Fig. 4, looking upwardly.

The lower portion of the legs of the tripod, designated by the numeral 10, may have any conventional construction. The upper extremity of each leg 10 is provided with a cross pin 11 which projects oppositely outward from both sides of the upper leg extremity. The upper extremities of the legs extend into sockets 54 formed in the bottom of a circular bed plate 13. These pins 11 rest in receiving notches formed in ledges 12 in the sockets and are clamped upwardly into their receiving notches in the ledges 12 by means of arms 15 formed on a spider plate 14, there being one arm extending on each side of each leg 10.

The spider plate 14 is clamped upwardly against the pins 11 by means of a clamp screw 16 having a vertical, circular finger ring 17 for convenient gripping. The ring 17 has a central opening 18 provided with a bottom notch 19. When the camera is used on a traveling support or dolly, the tripod can be tied down to the dolly by passing a tying member through the opening 18 and into the notch 19.

A circular centering block 20 is mounted concentrically on the bed plate 13 by means of suitable cap screws 21. The upper surface of the centering block is provided with a concentric, annular, ball-bearing race for receiving suitable bearing balls 22. A circular turret plate 23, having a similar annular ball race, rests upon the bearing balls 22.

The turret plate 23 is held in position by means of a flange ring 24 which is slidably inset in the centering block 20 and secured to the turret plate by means of suitable cap screws 25.

The above construction allows the turret plate to rotate freely and smoothly and with a minimum of friction on the balls 22 concentrically of the circular bed plate 13. The turret plate 23 may be locked at any desired position in its rotation on the bed plate by means of an eccentric cam 26 formed on the inner extremity of a cam shaft 27, the outer extremity of which terminates in a finger lever 28. The cam shaft 27 is rotatably mounted in a bushing 29 threaded radially into the turret plate 23. The cam 26 is positioned over the peripheral edge of the stationary centering block 20.

Thus, it can be seen that when the finger lever 28 is swung in one direction, for instance to a vertical position, the cam 26 will move out of contact with the centering block 20, allowing the turret plate 23 to be freely rotated. When the finger lever 28 is swung to another position, for instance to the horizontal position, the cam 26 will be wedged against the peripheral surface of the centering block 20, rigidly locking the turret plate 23 to the bed plate 13.

A bracket member 30 is mounted on the turret plate 23 and secured by means of suitable cap screws 31. The bracket member 30 rotatably supports a tilt shaft 32, upon which a camera platform 33 is fixedly mounted. The camera platform 33 has an inverted, U-shaped, with leg portions 34 extending downwardly to receive the extremities of the tilt shaft 32 and which are locked against rotation therein by means of suitable set screws 35.

A handle 36 is formed on, and extends outwardly and downwardly from, each leg portion 34 of the camera platform and at each side of the bed plate 13 in substantially A-shaped relation with each other. The handles 36 are preferably provided with finger-receiving indentations 37 on their inner surfaces. It can be seen that the camera platform 33 can be tilted forward and back about the axis of the tilt shaft 32 by simply swinging the flaring handles 36 forward and back.

The camera platform may be releasably locked in any desired position about the axis of the tilt shaft 32 by means of a split clevis 38 which is looped about the shaft 32 and terminates in two downwardly extending, substantially parallel extremities 39 positioned within the body of the bracket member 30. The clevis extremities 39 may be forced together, to cause the clevis to grip the tilt shaft 32, by means of an eccentric cam 40 formed on a locking stem 41 which projects outwardly to one side of the bracket member 30 and terminates in a thumb tab 42.

A compression spring 43 is enclosed in the bracket 30 and constantly acts against a radial pin 44 projecting from the cam 40 to urge the cam against the extremities 39 of the clevis 38 to cause the latter to grip and lock the tilt shaft 32 in the bracket member 30. The shaft may be released by simply pressing upon the finger lever tab 42 to rotate the eccentric cam 40 away from the extremities 39 against the action of the spring 43.

The camera is secured to the camera platform 33 by means of a standard threaded camera stud 45 which projects concentrically upward from a stud button 46. The stud button 46 is rotatably mounted in a circular receiving cavity in the camera platform 33, and may be locked therein by means of a pointed set screw 47 having a knurled finger-engaging head 48.

The point of the set screw 47 engages an inclined surface 49 on the stud button 46 to exert a wedging action on the latter which will draw the button downwardly so as to firmly seat the camera on the upper surface of the camera platform 33. This upper surface may be roughened, grooved, or knurled, if desired, to provide better gripping action on the camera.

The turret plate 23 is preferably provided with a suitable spirit level 50 for determining its level condition. A conventional cable release sleeve 51 is mounted in the upper portion of one of the handles 36 and is provided with a shutter release button 52, which acts through a flexible cable 53 to control the camera shutter. The button 52 is positioned in alignment with the natural position of the thumb of the hand gripping the handle 36.

In use, the legs 10 are adjusted to bring the bed plate 13 and the turret plate 23 to a level plane, as determined by the spirit level 50. The two handles 36 are then gripped with the operator's two hands, and by a simple swinging and turning movement of the handles, the camera can be quickly and easily pointed in any desired direction from a straight-down position ahead of the turret plate 23 to an upwardly-inclined position, and from right to left for panning purposes.

The camera platform is automatically locked at any desired tilt by the action of the spring 43 on the cam 40 but can be instantly released by simple pressure of the thumb on the thumb tab 42, without removing the hands from the handles. The shutter can also be opened and closed by simple thumb pressure, also without removing the hands from the handles, and the turret plate 23 may be locked by means of the finger lever 28 which is within easy reach of either the thumb or fingers of the operator.

It will be noted that all rearwardly-projecting control handles, as usually found on motion picture tripods, have been eliminated, so that the eye of the operator may be held to the finder of the camera without interference during all turning movements. Since the camera is controlled with two hands, it can be much more accurately and steadily moved to follow moving objects or for panoramic purposes than with the usual one-hand control handle.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. In a camera tripod of the type having a rotatable turret plate, means for supporting a camera on said turret plate comprising: a bracket member extending medially upward from said turret plate; a camera platform; two downwardly-extending, spaced-apart legs on said platform positioned on opposite sides of said bracket member; a tilt shaft mounted in said bracket member and extending oppositely outward into said legs to form a pivot therefor; means locking said shaft in said legs to prevent relative rotation therebetween; a split clevis surrounding said shaft within said bracket member; parallel extremities formed on said clevis member at opposite sides of the split therein, said extremities extending downwardly into a receiving socket in said bracket member; an eccentric cam rotatably mounted in said bracket member in contact with one of said extremities; and means for rotating said cam to cause the latter to urge the latter extremity toward the other extremity to contract said clevis about said shaft.

2. A camera tripod comprising: a leg-supported bed plate; a turret plate concentrically mounted on said bed plate; bearing balls separating said two plates; means preventing upward relative movement of said turret plate; an eccentric cam positioned between said two plates; means for rotating said cam to lock said plates together; a bracket member projecting upwardly from said turret plate; a horizontal tilt shaft rotatably supported in said bracket member, a camera platform fixedly mounted on said tilt shaft; a split clevis member surrounding said shaft and having its extremities extending into said bracket member in substantially parallel relation so as to prevent rotation of said clevis member; a locking stem rotatably mounted in said bracket member; an eccentric cam on said locking stem positioned to be swung against said extremities to force the latter together to cause said clevis member to grip said shaft; and a handle on said stem for rotating the latter.

3. A camera tripod comprising: a leg-supported bed plate; a turret plate concentrically mounted on said bed plate; bearing balls separating said two plates; means preventing upward relative movement of said turret plate; an eccentric cam positioned between said two plates; means for rotating said cam to lock said plates together; a bracket member projecting upwardly from said turret plate; a horizontal tilt shaft rotatably supported in said bracket member; a camera platform fixedly mounted on said tilt shaft; a split clevis member surrounding said shaft and having its extremities extending into said bracket member in substantially parallel relation so as to prevent rotation of said clevis member; a locking stem rotatably mounted in said bracket member; an eccentric cam on said locking stem positioned to be swung against said extremities to force the latter together to cause said clevis member to grip said shaft; a handle on said stem for rotating the latter; and a spring acting against said locking stem and urging said cam against said extremities.

4. A camera tripod comprising: a leg-supported bed plate; a turret plate concentrically mounted on said bed plate; bearing balls separating said two plates; means preventing upward relative movement of said turret plate; an eccentric cam positioned between said two plates; means for rotating said cam to lock said plates together; a bracket member projecting upwardly from said turret plate; a horizontal tilt shaft rotatably supported in said bracket member; a camera platform fixedly mounted on said tilt shaft; means for locking said tilt shaft against rotation when desired; and a handle formed integrally with and projecting outwardly and downwardly at each side of said camera platform, said handles being substantially similar and lying in substantially A-shaped relation to each other.

FRANCIS DAVID GRAETZ.

References Cited in the file of this patent

UNITED STATES PATENTS

| Number | Name | Date |
|---|---|---|
| 1,436,544 | Starr | Nov. 21, 1922 |
| 2,037,162 | Gent | Apr. 14, 1936 |
| 2,354,515 | Greenwood | July 25, 1944 |
| 2,424,499 | Pasturczak | July 22, 1947 |
| 2,471,886 | Nielsen | May 31, 1949 |
| 2,496,519 | Culbertson | Feb. 7, 1950 |
| 2,514,313 | Davidson et al. | July 4, 1950 |